United States Patent
Shin et al.

(10) Patent No.: US 8,154,819 B2
(45) Date of Patent: Apr. 10, 2012

(54) METHOD OF CONTROLLING FLYING HEIGHT OF MAGNETIC HEAD AND DISK DRIVE USING THE METHOD

(75) Inventors: Ho-chul Shin, Suwon-si (KR); Da-woon Chung, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 0 days.

(21) Appl. No.: 12/774,872

(22) Filed: May 6, 2010

(65) Prior Publication Data

US 2010/0284107 A1 Nov. 11, 2010

(30) Foreign Application Priority Data

May 7, 2009 (KR) .................. 10-2009-0039890

(51) Int. Cl.
*G11B 21/02* (2006.01)
*G11B 15/12* (2006.01)
(52) U.S. Cl. .......................... 360/75; 360/63
(58) Field of Classification Search .................. None
See application file for complete search history.

(56) References Cited

U.S. PATENT DOCUMENTS

| 4,777,544 A | 10/1988 | Brown et al. |
| 5,168,413 A | 12/1992 | Coker et al. |
| 2008/0192379 A1* | 8/2008 | Kurita et al. ............ 360/75 |

FOREIGN PATENT DOCUMENTS

| JP | 63-048652 | 3/1988 |
| JP | 2006-085885 | 3/2006 |

* cited by examiner

*Primary Examiner* — Andrew L Sniezek
(74) *Attorney, Agent, or Firm* — Volentine & Whitt, PLLC (57) ABSTRACT

The flying heights of magnetic heads of a disk drive are set using an FOD (flying on demand) method in a bank mode. A first signal for adjusting the flying height of a magnetic head is issued to each magnetic head and the value of the first signal is scaled by scale values set for the magnetic heads, respectively, with one of the scale values differing from the others. The value of the first signal is changed until the magnetic head associated with the scale value different from the others touches down. A flying height for the magnetic head which touched down is determined based on the value of the first signal at the time of touch-down. The process is repeated, however with a different bank of scale values each time and set in such a way as to cause the sequential touch-down of the remaining magnetic heads, and determinations of flying heights for the magnetic heads.

8 Claims, 6 Drawing Sheets

METHOD OF CONTROLLING FLYING HEIGHT OF MAGNETIC HEAD AND DISK DRIVE USING THE METHOD

CROSS-REFERENCE TO RELATED APPLICATIONS

This application claims the benefit of Korean Patent Application No. 10-2009-0039890, filed on May 7, 2009, in the Korean Intellectual Property Office.

BACKGROUND

The inventive concept relates to disk drives. More particularly, the inventive concept relates to a method and apparatus for controlling the height, i.e., the flying height, at which a magnetic head of a disk drive floats above a disk during a read or write operation.

In general, a hard disk drive employs a magnetic head to magnetize a recording surface of a disk or to pick up bits of magnetic data from the recording surface of the disk to thereby write data on the disk or read data from the disk. In this respect, the data is recorded on or read from tracks running in the circumferential direction of the disk, and the data storage capacity of the disk is a function of the bits per inch (BPI), i.e., the density of the data recorded along each track, and the tracks per inch (TPI), i.e., the number of tracks per inch in the radial direction. The data storage capacity of such a disk is being gradually increased, while at the same time the size of the hard disk is being decreased to meet demands for compact disk drives. Especially in the case of such compact disk drives, a very precise mechanism is required for positioning the magnetic head relative to the disk. In particular, a flying height of the magnetic head, namely, the distance between the magnetic head and the disk, must be precise. The manufacturing of the hard disk drive includes a process of implementing the specifications that establish the flying height. However, this process can be difficult to perform and the flying height of the head is often imprecise.

SUMMARY

The inventive concept provides a method of controlling flying heights of magnetic heads of a disk drive, wherein the magnetic heads are sequentially caused to touch down using a flying on demand (FOD) signal scaled and distributed to the magnetic heads in a bank mode, a flying height for each magnetic head is determined on the basis of the value of the FOD signal at the time the magnetic head touches down, and the magnetic heads are controlled based on the flying heights so determined.

Each of the magnetic heads is positioned across from a respective surface of a disk while the disk is being rotated. A first signal, that changes the flying height of any of the magnetic heads when applied thereto, is generated. Also, a bank of scale values associated with the magnetic heads, respectively, is established. The scale value associated with one of the magnetic heads differs from all of the other scale values in the bank. A first signal is applied to each of the magnetic heads while the value of the first signal is adjusted with the scale values associated with the heads, respectively. Also, the value of the first signal is changed until one of the magnetic heads (the magnetic head associated with the scale value that differs from the other scale values) touches down ahead of the remaining magnetic heads. Next, a flying height of the magnetic head that touched down is determined based on the value of the first signal that was being applied at the time of the touch-down.

For each other of the magnetic heads, the applying, changing and determining steps are repeated using other banks of scale values that will cause the magnetic heads to touch down in sequence. Flying heights are determined for these magnetic heads, respectively, each based on the value of the first signal that was being applied at the time of the touch-down of the magnetic head as in the case of the first head which was caused to touch down.

The flying heights of the magnetic heads are controlled using the flying heights determined for the magnetic heads, respectively. For example, the flying heights are controlled in a process of copying a final servo pattern to several disks of the drive.

The inventive concept also provides a disk drive that can determine flying heights of magnetic heads using a bank FOD method, and controls the flying heights using the flying heights so determined. The disk drive includes a plurality of magnetic heads each including a heater that generates heat in proportion to the amount of current supplied thereto, a heater current supplying circuitry operatively connected to the magnetic heads so as to supply signals whose values correspond to the amount of current supplied to the heaters of the magnetic heads, respectively, and a controller operatively connected to the heater current supply circuitry.

The controller is configured to generate a first signal and issue the first signal to the heater current supply circuitry. The heater current supplying circuitry includes a scaler circuit through which the first signal supplied from the controller is supplied at the same time to the magnetic heads while the value of the first signal is scaled by scale values associated with the magnetic heads, respectively, when the disk drive is operating in a bank ON mode. Therefore, signals of different values are issued to the magnetic heads when the disk drive is operating in the bank ON mode.

The controller is operative to change the value of the first signal as the first signal is being supplied to the scaler circuit of the heater current supplying circuitry. Thus, one of the magnetic heads will touch down when the controller changes the value of the first signal while the disk drive is operating in the bank ON mode. The controller is also operative to adjust the scale values by which the value of the first signal is scaled in the scaler circuit of the heater current supplying circuitry, and the controller is configured to determine a flying height for each of the magnetic heads. The flying height is determined based on the value of the first signal issued to the magnetic head at the time the head is caused to touch down while the disk drive is operating in the bank ON mode and on a magnetic head profile comprising a correlation between flying heights and values of the first signal

BRIEF DESCRIPTION OF THE DRAWINGS

The inventive concept will be more clearly understood from the following detailed description of preferred embodiments thereof taken in conjunction with the accompanying drawings in which.

DETAILED DESCRIPTION OF THE PREFERRED EMBODIMENTS

Embodiments of the inventive concept will be described in detail with reference to the attached drawings. Note, like reference numerals denote like elements throughout the drawings. Also, throughout the specification and claims, the term of art term touch-down or the descriptive terms touches down on or relative to a disk are to be construed synonymously as would be understood by those of ordinary skill in the art. Likewise, the term flying height is a term of art whose plain meaning is understood by those of skill in the art as referring to the distance at which a head floats on a cushion of air above a surface of a disk in a disk drive during a read/write operation, for example, in which the disk is rotating.

Figure 1:
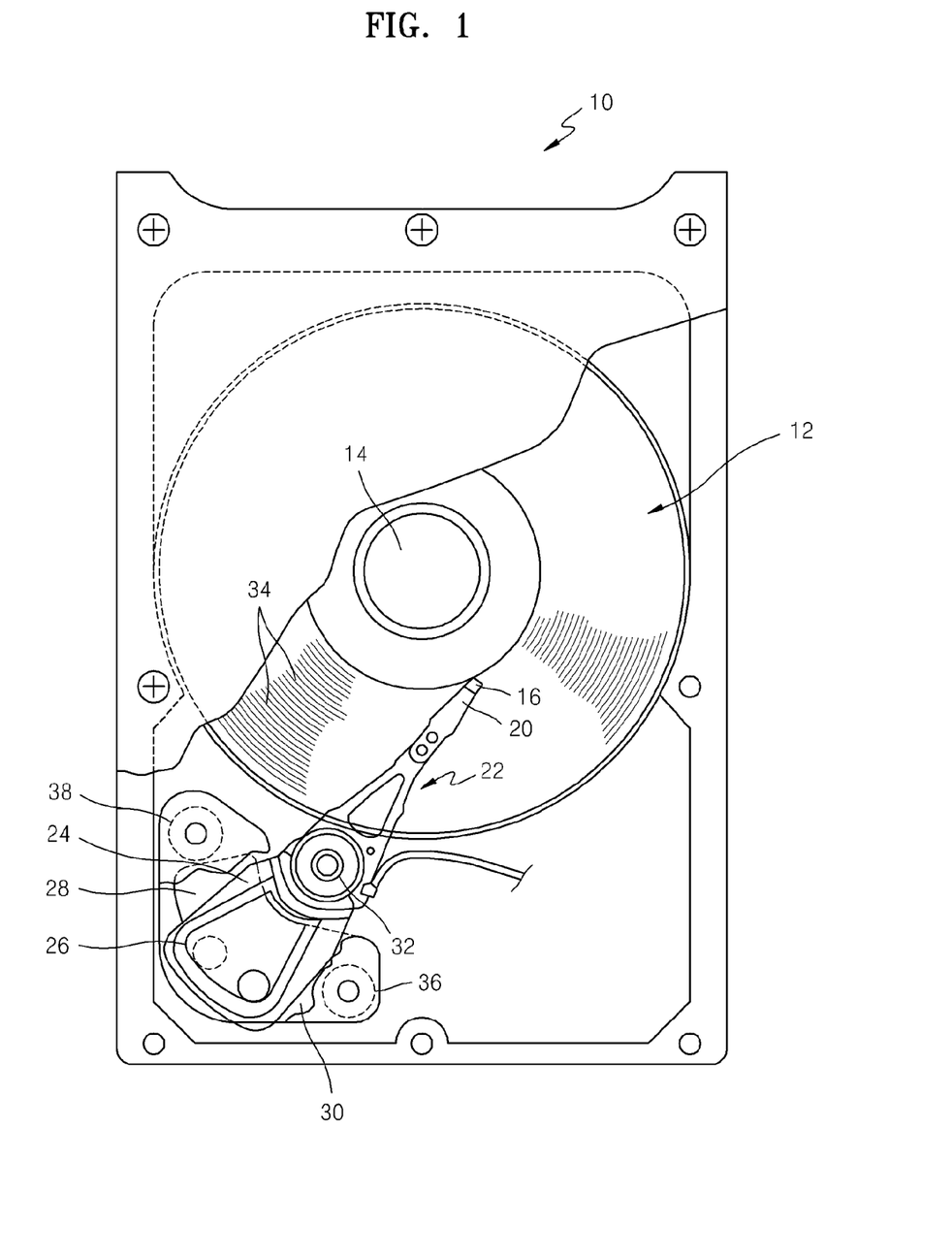
FIG. 1 is a plan view of an embodiment of a disk drive according to the inventive concept.
Figure 2:
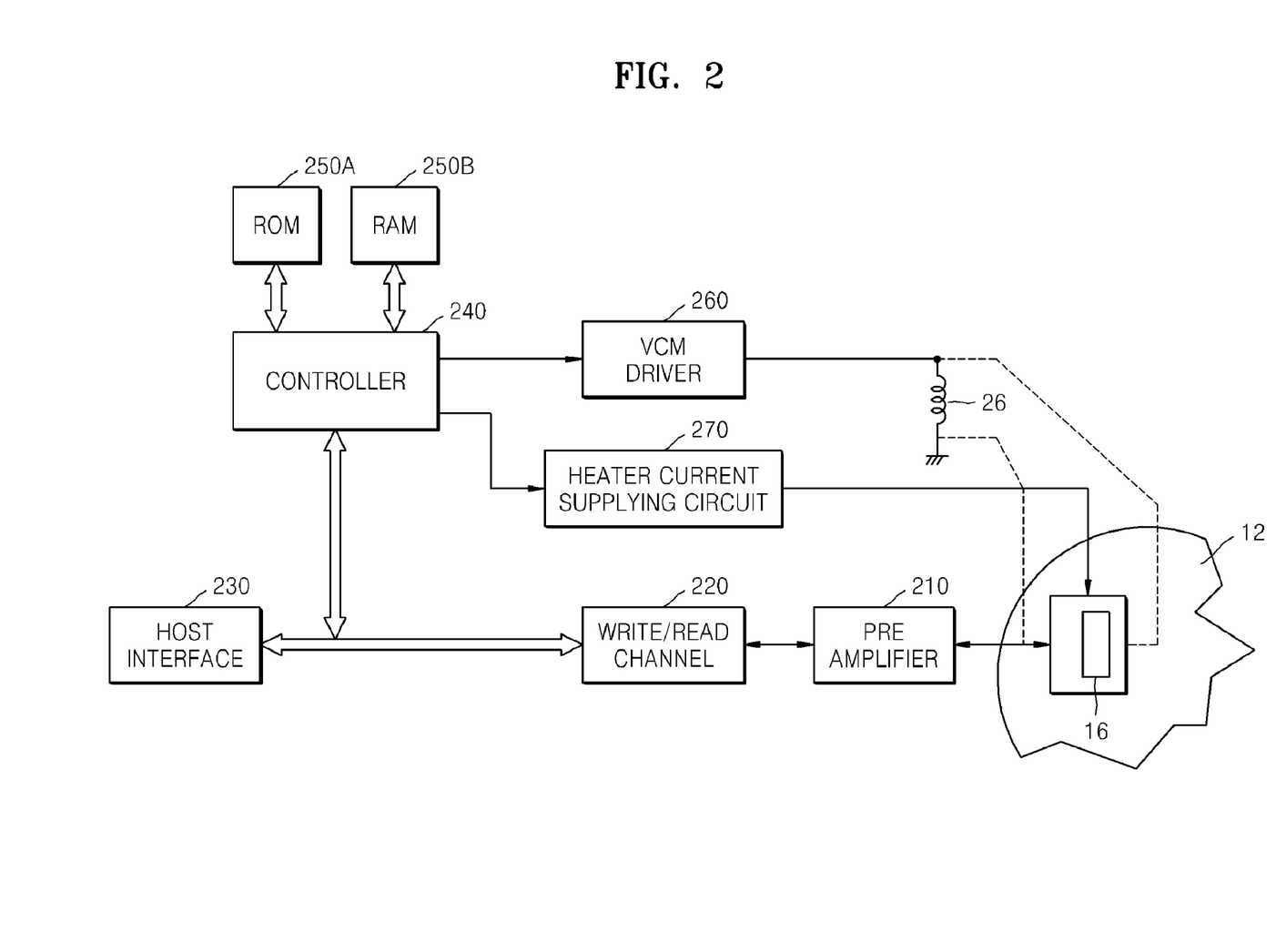
FIG. 2 is a block diagram of electronics of the disk drive according to the inventive concept.

Referring to FIGS. 1 and 2, an embodiment of a disk drive 10 according to the inventive concept includes a spindle motor 14, at least one disk 12 that is rotated by the spindle motor 14, a head stack assembly (HSA) 22 including at least one magnetic head 16 for reading or recording information from or on the at least one disk 12, and electronics for controlling mechanical components of the HSA 22. The magnetic head 16 is positioned adjacent to a surface of the disk 12 during a read/write operation in which data is being read from or recorded on the disk 12.

In general, the magnetic head 16 comprises a transducer that detects a magnetic field emanating from the disk 12 or magnetizes the disk 12 to read or record information from or on the disk 12. More specifically, though, a respective magnetic head 16 is operatively associated with each surface of each disk 12, and each magnetic head 16 comprises two transducers. That is as is conventional in the art, per se, each magnetic head 16 comprises a respective transducer for magnetizing the surface of a disk 12 (a so called writer), and a separate transducer for detecting a magnetic field emanating from the surface of the disk 12 (a so called reader). The reader typically comprises a magneto-resistive (MR) device. However, for ease of description, each magnetic head 16 will sometimes be described hereinafter as simply comprising a transducer operatively associated with a surface of a particular disk 12.

Each magnetic head 16 is integrated into a head stack assembly (HSA) 22 and, more specifically, is supported by a suspension or flexure 20 of the HSA 22. The HSA 22 is attached to an actuator arm 24 including a voice coil 26. The voice coil 26 is disposed adjacent to a magnetic assembly 28, and together the voice coil 26 and the magnetic assembly 28 constitute a voice coil motor 30. A current supplied to the voice coil 26 generates torque that rotates the actuator arm 24 about the axis of a bearing assembly 32 through which the HSA 22 and actuator arm 24 are connected. The rotation of the actuator arm 24 in turn causes the transducer to move across the surface of the disk.

Information is generally stored in annular tracks 34 of the disk 12. Each annular track 34 generally includes a plurality of sectors. Each sector includes a data field and a servo field. A preamble, a servo address mark (SAM)/servo index mark (SIM), a gray code, and a burst signal are written in the servo field. The transducer is positioned by the voice coil motor to read or write information from or onto a designated annular track 34.

Also, during the read/write operation, as the disk 12 rotate, a cushion of air is produced between a surface of the disk 12 and the transducer. Due to a countervailing force provided by the suspension 20, the transducer is floated on the cushion of air over the disk 12 at a height (flying height) dependent on such factors as the elasticity of the suspension 20. The magnetic head 16 also includes a (resistive) heater. Heat generated by the heater can thermally expand the magnetic head 16 to change the flying height of the magnetic head 16 (transducer).

As was mentioned above, when the hard disk drive 10 includes a plurality of disks 12, the hard disk drive 10 also includes a plurality of magnetic heads 16, one for each surface of each disk 12. For example, when the hard disk drive 10 has two disks 12, the HSA 22 has four magnetic heads 16. Also, each of the magnetic heads 16 includes a heater (referred to above).

Figure 6:
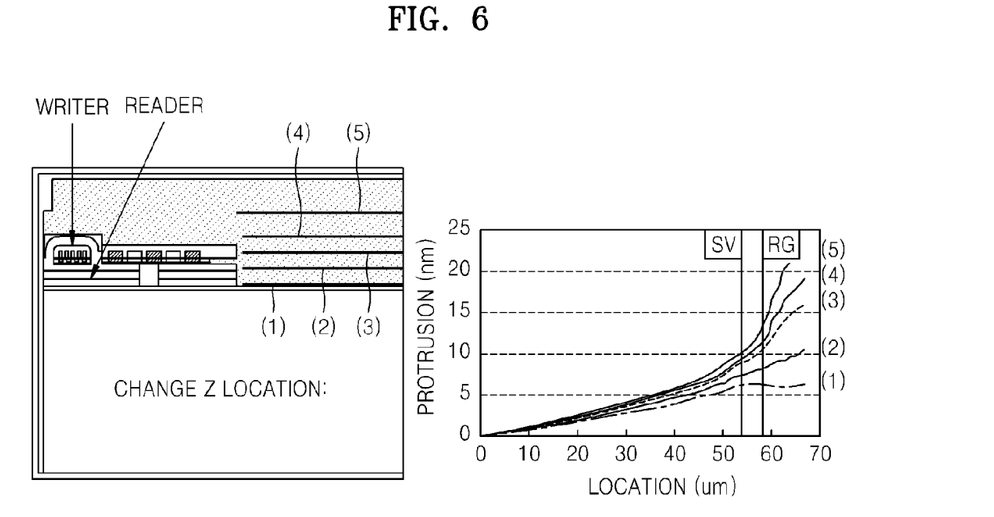
FIG. 6 is a cross-sectional view of a magnetic head for explaining a method of determining the position of a heater included in a magnetic head, and a graph showing the relationship of the expansion of an air bearing surface according to the location of a heater, according to the inventive concept.

As illustrated in FIG. 6, a location that makes an optimal expansion condition is determined by measuring the expansion of an air bearing surface of the magnetic head by applying current to the heater while changing the location Z of the heater, for example, a coil for a heater. Thus, the heater may be installed at the position (1) where the air bearing surface relatively regularly expands between the reader location SV and the writer location RG in the graph of FIG. 6.

Referring now to FIG. 2, the electronics of the disk drive includes a pre amplifier 210, a write/read channel 220, a host interface 230, a controller 240, a read only memory (ROM) 250A, a random access memory (RAM) 250B, a voice coil motor (VCM) driver 260, and a heater current supplying circuit 270.

Figure 4:
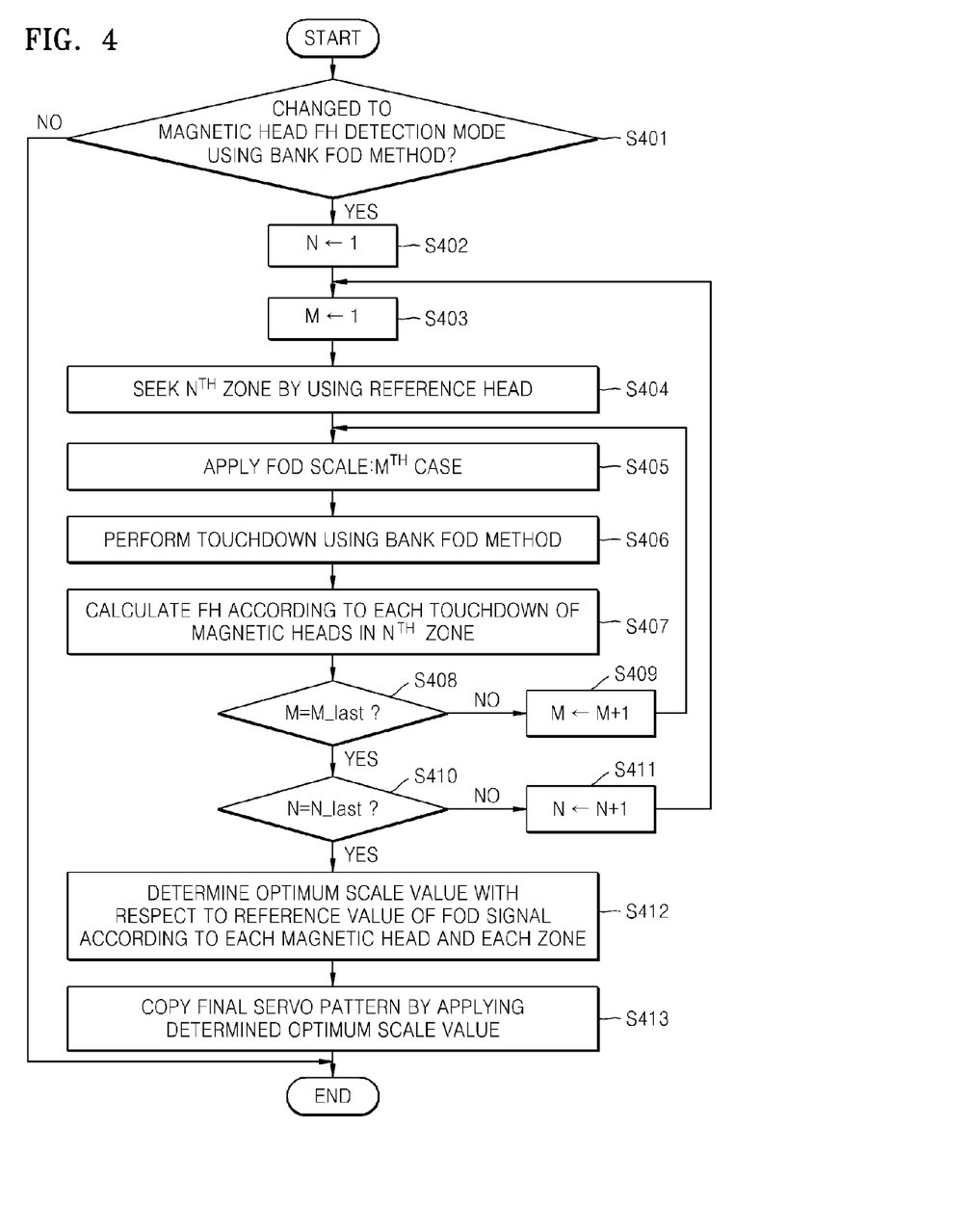
FIG. 4 is a flowchart of an embodiment of a method of controlling the flying height of magnetic heads of a disk drive, according to the inventive concept.
Figure 5:
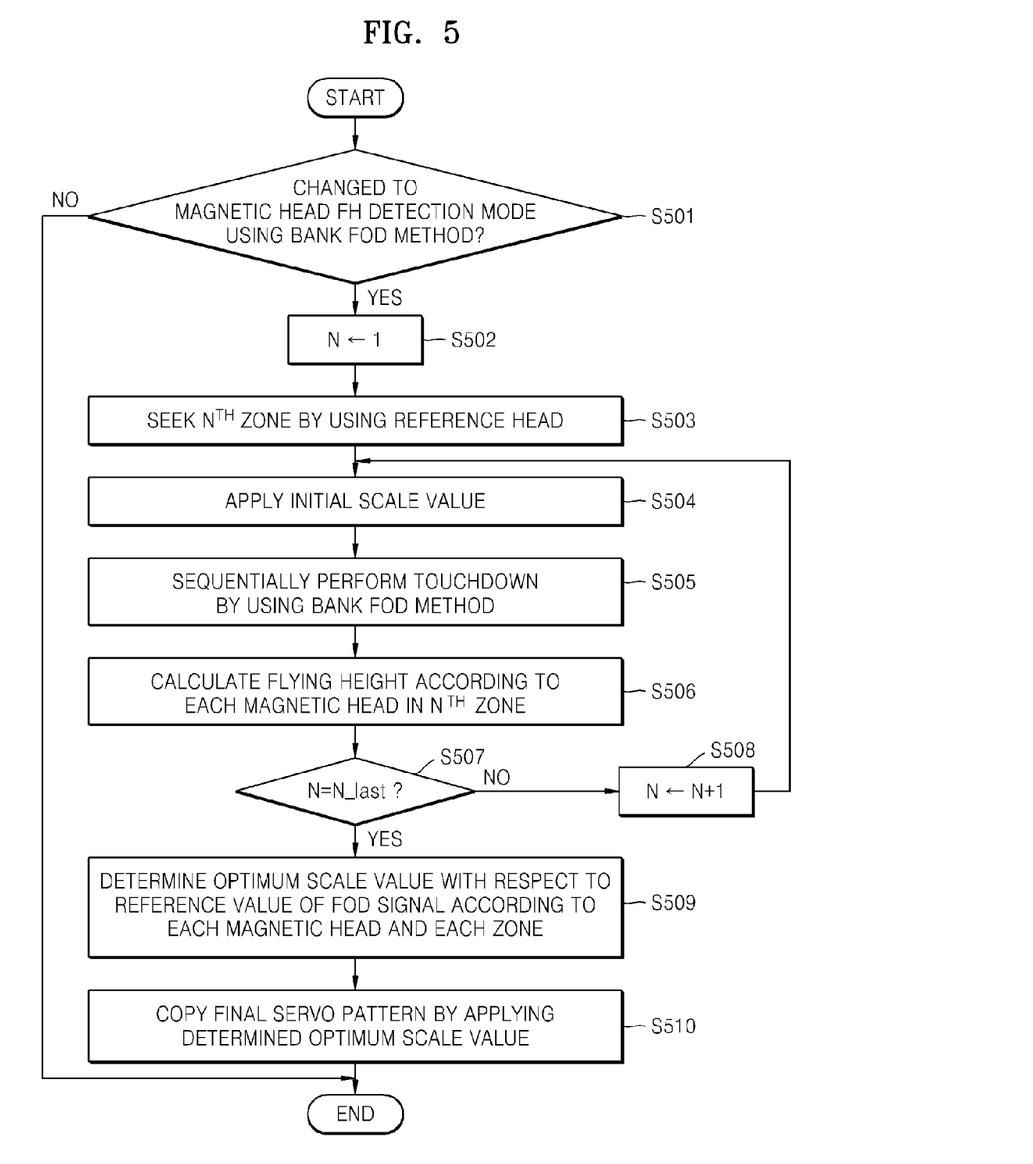
FIG. 5 is a flowchart of another embodiment of a method of controlling the flying height of magnetic heads of a disk drive, according to the inventive concept.

The ROM 250A stores firmware for controlling the disk drive, and control information, and specifically includes program codes and information for executing methods illustrated in FIGS. 4 and 5. The RAM 250B stores information required to operate the disk drive, wherein the information is read from the ROM 250A or the disk 12 during an initial disk drive operation.

The controller 240 analyzes a command received from a host device (not shown) via the host interface 230, and controls the disk drive according to the analyzed command. For example, the controller 240 supplies a control signal to the VCM driver 260 which controls the position the magnetic head 16.

General operations of the disk drive will now be described.

In a data read mode, the pre amplifier 210 of the disk drive primarily amplifies an electric signal detected by a reader of the magnetic head 16. Then, the write/read channel 220 amplifies the signal amplified by the pre amplifier 210 up to a certain level by controlling a gain using an automatic gain control circuit (not shown), encodes the signal amplified up to a certain level to a digital signal that can be read by the host device, and converts the digital signal to a data stream. The data stream is then transmitted to the host device via the host interface 230.

In a data write mode, the write/read channel 220 of the disk drive converts data received from the host device via the host interface 230 into a binary data stream suitable for a write channel. The data stream is amplified by the pre amplifier 210 and is written on the disk 12 via a writer of the magnetic head 16.

The write/read channel 220 reproduces the preamble, the SAM/SIM, the gray code, and the burst signal written in the servo field of the disk 12, and provides information required for seeking and following a track to the controller 240. In a servo copy process, the write/read channel 220 reproduces a reference servo pattern written on one surface of one of a plurality of disks 12 by using a reference head, and provides information required for seeking and following a track to the controller 240.

The controller 240 generates various control signals, such as a flying on demand (FOD) signal, a bank mode on/off control signal, and a head selection control signal, required to control the disk drive. Also, the controller 240 calculates/determines a flying height for each magnetic head in general with respect to a disk of for each zone over which the head may be positioned. Furthermore, the controller 240 determines an optimum scale value, and executes a control program in which a final servo pattern is copied. These functions and operations of the controller 240 will be described later in more detail with reference to FIGS. 4 and 5.

The FOD signal regulates the current to be applied to the heater of the magnetic head 16. In general, the tip of a pole of the magnetic head 16 is thermally expanded due to and in proportion to the amount of the current supplied to the heater whereby the flying height of the magnetic head 16 is adjusted. That is, the flying height of the magnetic head 16 is controlled by the FOD signal.

The bank mode on/off control signal CONT1 is a control signal for determining whether the FOD signal is to be issued to all magnetic heads 16 in a bank mode, or to just a select (single) magnetic head 16. The head selection control signal CONT2 is a control signal used to select the magnetic head 16 to which the FOD signal is supplied when the hard disk drive is not operating in the bank mode.

Figure 3:
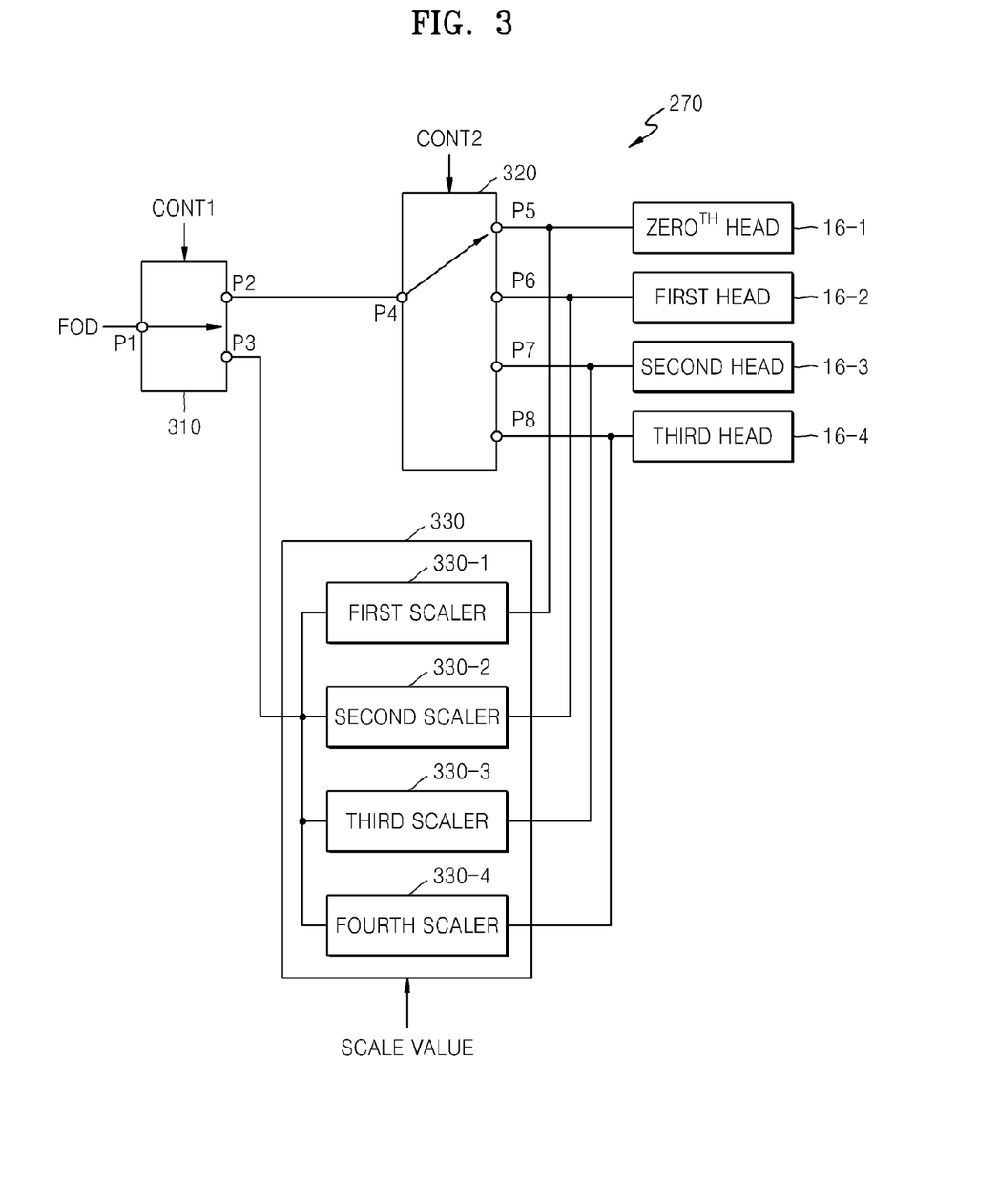
FIG. 3 is a detailed schematic diagram of a heater current supply circuit of the disk drive of FIGS. 1 and 2.

The heater current supplying circuit 270 supplies current to the heater of each of the magnetic heads 16. A detailed configuration of the heater current supplying circuit 270 is shown in FIG. 3. Referring to FIG. 3, the heater current supplying circuit 270 includes a first switching circuit 310, a second switching circuit 320, and a scaler circuit 330.

The scaler circuit 330 is designed to correspond to the number of magnetic heads 16 of the disk drive. In other words, when the disk drive has four magnetic heads 16, the scaler circuit 330 includes first through fourth scalers 330-1 through 330-4 as shown in FIG. 3

The first switching circuit 310 outputs an FOD signal, received from an input terminal P1, to a first output terminal P2 or a second output terminal P3 depending on the bank mode on/off control signal CONT1. Specifically, when the bank mode on/off control signal CONT1 indicates the status of the bank mode as off, the input terminal P1 is connected to the first output terminal P2, and when the bank mode on/off control signal CONT1 indicates the status of the bank mode as on, the input terminal P1 is connected to the second output terminal P3.

The second switching circuit 320 outputs the FOD signal, received from an input terminal P4, to one of output terminals P5 to P8 selected according to the head selection control signal CONT2. For example, when the head selection control signal CONT2 selects a zero$^{th}$ head 16-1, the input terminal P4 is connected to the output terminal P5 corresponding to the zero$^{th}$ head 16-1.

The scaler circuit 330 adjusts the FOD signal, received when the disk drive is in a bank mode (i.e., when the status of the bank mode is indicated as on), according to a scale value set in the first through fourth scalers 330-1 through 330-4 respectively corresponding to the four magnetic heads 16.

The scaler circuit 330 also applies the adjusted FOD signal to (the heater of) each of the zero$^{th}$ through third heads 16-1 through 16-4.

A method of controlling the flying height of magnetic heads of a disk drive, according to an embodiment of the inventive concept, will now be described with reference to FIG. 4.

First, the controller 240 determines whether the disk drive is to be operated in a magnetic head flying height (FH) detection mode (S401). For example, the magnetic head FH detection mode may be initiated by a command received through the host interface 230 at the time a servo copy process is to be performed. For reference, the servo copy process is a process of copying a final servo pattern on all surfaces of one or more of the disks using a reference servo pattern recorded on a surface of one of the disks.

When the mode of the disk drive is changed to the magnetic head FH detection mode, the controller 240 generates the bank mode on/off control signal CONT1 indicative of the status of the bank mode as on. Accordingly, the input terminal P1 of the first switching circuit 310 is connected to the second output terminal P3 of the first switching circuit 310.

Next, the controller 240 sets a value of N to 1 (S402) and sets a value of M to 1 (S403) using an internal counter.

Then, the controller 240 controls the disk drive to seek a location of an N$^{th}$ zone of the disk using a reference head (S404). Thus, a first zone is sought because at this time the value of N is 1.

The reference head is a magnetic head corresponding to the surface of one of the disks on which the reference servo pattern is written. Accordingly, the reference head follows a track of the disk on which the reference servo pattern is written.

Next (S405), the controller 240 sets scale values of the first through fourth scalers 330-1 through 330-4 of the scaler circuit 330 to scale values corresponding to an M$^{th}$ case according to a scale table like Table 1 below.

TABLE 1

|  | First Case | Second Case | Third Case | Fourth Case |
|---|---|---|---|---|
| Zero$^{th}$ Head | 100% | 25% | 25% | 25% |
| First Head | 25% | 100% | 25% | 25% |
| Second Head | 25% | 25% | 100% | 25% |
| Third Head | 25% | 25% | 25% | 100% |

Table 1 is an example of a scale table when the disk drive has four magnetic heads. The FOD signal for adjusting the flying height of a magnetic is scaled by a percentage of the scale value indicated in the table. More specifically, and referring to Table 1, the value of the FOD signal issued to (the heater of) only one magnetic head is set to have a high percentage (100%) of the scale value, and the values of the FOD signals issued to (the heaters of) the remaining magnetic heads, respectively, are set to have a low percentage (25%) of the scale value. Also, as is shown in the table, the magnetic head receiving the FOD signal set to a high percentage of the scale value changes depending on the case.

When operation S405 is performed for the first time, the value of M is 1, and thus the scale values of the first through fourth scalers 330-1 through 330-4 are adjusted according to the percentages of the first case of Table 1.

Next (S406), the controller 240 controls the disk drive to perform a touchdown using the bank FOD method. In particular, the controller 240 applies an FOD signal to the first switching circuit 310 and varies the value of the FOD signal until one of the magnetic heads touches down on the surface of the disk associated therewith.

In this case, the FOD signal input through the second output terminal P3 of the first switching circuit 310 is adjusted according to the scale values of the first through fourth scalers 330-1 through 330-4, and the adjusted FOD signals are then applied to each of the zero$^{th}$ through third heads 16-1 through 16-4, respectively. For reference, in the first case, wherein the value of M is 1, the percentage change of the scale value in the first scaler 330-1 rate is 100%, and the percentage change of the scale value in each of the remaining second through fourth scalers 330-2 through 330-4 is 25%. Accordingly, a 100% FOD signal is applied only to the zero$^{th}$ head 16-1, and a 25% FOD signal is applied to the first through third heads 16-2 through 16-4. This means that 100% of the current of the original FOD signal is applied only to the zero$^{th}$ head 16-1, and 25% of the current of the original FOD signal is applied to each of the remaining first through third heads 16-2 through 16-4.

Accordingly, the zero$^{th}$ head 16-1 will touch down first when the FOD signals, scaled according to the percentages shown in the first case in Table 1, are applied to the magnetic heads, respectively, while the disk drive is operated in the bank mode and the FOD signal is increased.

The controller 240 determines that touchdown has occurred when the controller 240 detects a remarkable increase in a position error signal, for example. Also, the controller 240 may determine the value of the FOD signal that causes a magnetic head to touch down by logging the value of the FOD signal supplied at the point in time at which the remarkable increase in the position error signal is detected.

The controller 240 then calculates flying height for the magnetic head, when in the N$^{th}$ zone, based on the FOD signal that causes the magnetic head to touch down in the N$^{th}$ zone (S407). More specifically, the height at which a magnetic head will fly (float) over the disk when an FOD signal is not applied thereto may be calculated based on the value of the FOD signal which would cause the magnetic head to touch down on the disk, by using a reference profile offering a correlation between the values of FOD signals and the resulting flying heights when such values are applied to the magnetic head. The reference profile may be created by sampling a number of disk drives, and then averaging the values obtained by sampling the disk drives.

After operation S407, the controller 240 determines whether the value of M corresponds to M_last (S408). M_last corresponds to the total number of magnetic heads of the disk drive. In other words, M_last is 4 when the disk drive has four magnetic heads.

If it is determined that the value of M does not correspond to M_last in operation S408, the controller 240 adds 1 to the value of M (S409), and the method reverts to operation S405. Accordingly, when the disk drive has four magnetic heads, the flying height of each magnetic head in the same zone is calculated by causing the magnetic heads to sequentially touchdown using the FOD signal scaled according to the first case through fourth cases of Table 1, respectively. That is, in each case a bank of FOD signals are applied to the magnetic heads, but the scale of the signals ensures that only one of the magnetic heads will touch down in the zone in each case.

Thus, a flying height of the zero$^{th}$ head 16-1 may be calculated during a bank mode in which FOD signals are applied in bank to the magnetic heads, the signals being generated by scaling an FOD signal according to the first case shown in Table 1. Likewise, a flying height of the first head 16-2 may be calculated during a bank mode implemented according to the second case shown in Table 1. Also, flying heights of the second head 16-3 and the third head 16-4 may be calculated during the bank mode implemented according to the third case and the fourth case, respectively.

If, on the other hand, it is determined that the value of M corresponds to M_last in operation S408, it is determined whether the value of N corresponds to N_last (S410). N_last is a value representing the last zone in the disk. Thus, if the value of N corresponds to N_last, flying heights have been calculated for all magnetic heads in all of the zones.

On the other hand, if it is determined that the value of N does not correspond to N_last, the controller 240 adds 1 to the value of N (S411), and the method reverts to operation S403.

Once the value of N has been determined to correspond to N_last, the controller 240 determines the optimum scale value with respect to a reference value of an FOD signal which when applied will cause the magnetic head to fly at a target height. The optical scale value is determined based on the flying heights calculated for the magnetic heads in each of the zones (S412). This is the scale value (FIG. 3) that will be applied thereafter to the (reference) value of the FOD signal and thereby produce adjusted FOD signals which, when applied, will position the magnetic heads at the target flying height in each of the zones. Here, the reference value of the FOD signal is determined using the reference profile, i.e., the value selected is that correlated with the target flying height.

Finally (S413), the controller 240 controls the disk drive to copy the final servo pattern to all of the disks of the disk drive, in a mode in which the optimum scale value (determined in operation S412) is applied to the scaler circuit 330.

A method of controlling the flying height of magnetic heads, according to another embodiment of the inventive concept, will now be described with reference to FIG. 5.

First, the controller 240 determines whether the disk drive is to be operated in a magnetic head flying height (FH) detection mode (S501). For example, the magnetic head FH detection mode may be initiated by a command received through the host interface 230 at the time a servo copy process is to be performed.

When the mode of the disk drive is changed to the magnetic head FH detection mode, the controller 240 sets a value of N to 1 using an internal counter (S502).

Next, the controller 240 controls a reference head of the disk drive to seek the location of an N$^{th}$ zone of a disk using (S503). When operation S503 is performed for the first time, the value of N is 1, and thus the location of a first zone is sought.

Then, the controller 240 sets scale values of the first through fourth scalers 330-1 through 330-4 of the scaler circuit 330 to initial scale values, corresponding to a reference scale value adjusted according to the percentages shown in Table 2 below (S504).

Table 2 is an example of a scale table when the disk drive includes 4 magnetic heads. Referring to Table 2, it can be seen that the initial scale values of the first through fourth scalers 330-1 through 330-4 respectively differ from one another by equal amounts. Here, the differences are each 25% of the reference scale value.

TABLE 2

|  | Initial Scale Value |
|---|---|
| Zero$^{th}$ Head | 100% |
| First Head | 75% |
| Second Head | 50% |
| Third Head | 25% |

The controller 240 controls the disk drive to perform a sequential touchdown process while in a bank FOD mode (S505). More specifically, the controller 240 changes the value of the (reference) FOD signal until one of the magnetic heads touches down on the disk. Accordingly, the zero$^{th}$ head 16-1 touches down first due to the adjustment of the value of the FOD signal by the initial percentages of the scale value shown in Table 2. The controller 240 also stores, in a register of the controller 240 or in the RAM 250B, the value of the FOD signal applied at the time when the touchdown of the zero$^{th}$ head 16-1 occurs. Then, the controller 240 changes the percentage (in Table 2) by which the scale value is multiplied in the first scaler 330-1 to 0%. Thus, the adjusted value of the FOD signal applied to the zero$^{th}$ head 16-1 is 0. Accordingly, the flying height of the zero$^{th}$ head 16-1 increases. The controller 240 continuously changes the value of the FOD signal until the touchdown of the next magnetic head, i.e., the first head 16-2, takes place. The first head 16-2 touches down because the value for the second scaler 330-2 set in Table 2 (75% of the scale value) is now the highest amongst all the remaining scalers. Similarly to the first case, the controller 240 stores, in the register of the controller 240 or in the RAM 250B, the value of the FOD signal applied at the time the first head 16-2 touches down. Then, the controller 240 changes the percentage (in Table 2) by which the scale value is multiplied in the second scaler 330-2 to 0%. This process is likewise repeated, in sequence, for the second head 16-3 and the third head 16-4.

The controller 240 next calculates a flying height for each magnetic head in the N$^{th}$ zone in which the sequential touchdown process has been performed (S506). The flying height for each magnetic head is calculated based on the FOD signal stored, in the register of the controller 240 or in the RAM 250B, at the time the touchdown of the magnetic head occurred. More specifically, the height at which a magnetic head will fly (float) over the disk when an FOD signal is not applied thereto is calculated based on the value of the FOD signal which would cause the magnetic head to touch down on the disk, by using a reference profile offering a correlation between the values of FOD signals and the resulting flying heights when such values are applied to the magnetic head.

Next, the controller 240 determines whether the value of N corresponds to N_last (S507).

If the value of N does not correspond to N_last, the controller 240 adds 1 to the value of N (S508), and the method reverts to operation S504.

On the other hand, if the value of N corresponds to N_last, the controller 240 determines the optimum scale value based on the flying heights calculated for the magnetic heads in each zone (S509).

Finally (S510), the controller 240 controls the disk drive to copy the final servo pattern to all of the disks of the disk drive, in a mode in which the optimum scale value (determined in operation S509) is applied to the scaler circuit 330.

For reference, the method of FIG. 5 is most effective when differences in the flying heights of the magnetic heads due to limitations in the process of assembling the magnetic heads and differences in the thermal expansion of the pole tips of the magnetic heads are smaller than the differences between the flying heights of the magnetic heads produced according to the FOD method described above in which the hard drive is in a bank on mode and the scale value is adjusted according to the percentages shown in Table 2.

Also, although not illustrated in FIGS. 4 and 5, a process of detecting an inferior magnetic head, namely a magnetic head that normally does not fly at a proper height, may be incorporated into either of the methods described above with respect to FIGS. 4 and 5. In this case, the defect is determined using the flying heights calculated for each magnetic head and in each zone. In other words, the magnetic head is determined to be inferior when a calculated flying height of the magnetic head is outside of a threshold, i.e., is outside a predetermined range of flying heights. The threshold may correspond to a range of values of an FOD signal that can be adjusted by the scaler circuit 330.

Finally, embodiments of the inventive concept have been described herein in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. A method of controlling a flying height of a magnetic head, the method comprising:
    applying a first signal for adjusting a flying height of a magnetic head to each magnetic head according to a scale value set according to each magnetic head, and performing touchdown by changing a value of the first signal; and
    calculating a flying height of a magnetic head for which touchdown is to be performed based on the value of the first signal that was changed to perform touchdown of the magnetic head,
    wherein a flying height is sequentially calculated according to each magnetic head by changing a magnetic head for which touchdown is to be performed, by sequentially adjusting the scale value set according to each magnetic head, and
    wherein the method further comprises determining a scale value with respect to a reference value of the first signal according to each magnetic head, to maintain a target flying height based on the calculated flying height, and copying a servo pattern by applying the scale value with respect to the reference value of the first signal.

2. The method of claim 1, wherein, in the calculating of the flying height, the flying height of the magnetic head for which touchdown is to be performed based on the value of the first signal that was changed to perform touchdown of the magnetic head, is calculated by using a reference profile indicating a relationship between a flying height of a magnetic head and a value of the first signal.

3. The method of claim 1, wherein the performing of the touchdown is performed while following a reference servo pattern written on a disk by using one reference head selected from the magnetic heads.

4. The method of claim 1, wherein the performing of the touchdown and the calculating of the flying height are performed according to each zone of a disk.

5. The method of claim 1, wherein, further comprising determining a magnetic head has an inferior flying height, when a flying height of the magnetic head is not within an initially set threshold range.

6. A disk drive comprising:
    a plurality of magnetic heads each including a heater;
    a heater current supplying circuit that adjusts a value of a first signal to be supplied to each of the heaters included in the magnetic heads, in a bank mode in which the first signal is issued to each of the plurality of magnetic heads; and
    a controller that adjusts a scale value for determining the value of the first signal of the heater current supplying circuit in the bank mode, and calculates a flying height according to each magnetic head for which touchdown is to be performed based on the value of the first signal by using a reference profile of a flying height according to a value of first signal, by performing touchdown whenever the scale value is adjusted, wherein the heater current supplying circuit comprises:

a first switching circuit that connects an input terminal receiving the first signal to a first output terminal in a bank mode off status, and to a second output terminal in a bank mode on status;

a second switching circuit that connects an input terminal receiving a signal output from the first output terminal of the first switching circuit to an output terminal connected to the heater of a magnetic head to correspond to a head selection control signal; and a scaler circuit that adjusts the signal output from the second output terminal of the first switching circuit according to a scale value set according to each of the magnetic heads, and outputs the adjusted signal to an output terminal corresponding to each of the magnetic heads.

7. The disk drive of claim 6, wherein the controller calculates the flying height while following a reference servo pattern recorded on a disk by using one reference head selected from the magnetic heads.

8. A disk drive comprising:

a plurality of magnetic heads each including a heater;

a heater current supplying circuit that adjusts a value of a first signal to be supplied to each of the heaters included in the magnetic heads, in a bank mode in which the first signal is issued to each of the plurality of magnetic heads; and a controller that adjusts a scale value for determining the value of the first signal of the heater current supplying circuit in the bank on mode, and calculates a flying height according to each magnetic head for which touchdown is to be performed based on the value of the first signal by using a reference profile of a flying height according to a value of first signal, by performing touchdown whenever the scale value is adjusted, wherein the controller determines a scale value with respect to a reference value of a first signal according to each magnetic head so as to maintain a target flying height based on the calculated flying height, and controls the disk drive to copy a servo pattern after applying the scale value to the heater current supplying circuit.

* * * * *